Figure 1:
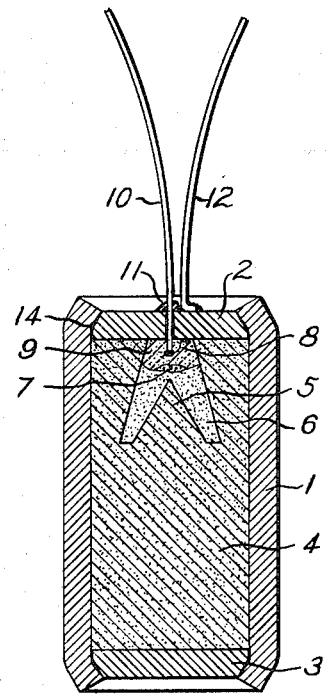

Sept. 20, 1960 R. A. LLOYD 2,953,443
CHEMICAL HEATING COMPOSITION, HEATING UNIT CONTAINING
THE SAME AND METHOD OF MANUFACTURE
Filed Feb. 11, 1957 3 Sheets-Sheet 1

INVENTOR
ROGER A. LLOYD
BY Beale and Jones

Sept. 20, 1960 R. A. LLOYD 2,953,443
CHEMICAL HEATING COMPOSITION, HEATING UNIT CONTAINING
THE SAME AND METHOD OF MANUFACTURE
Filed Feb. 11, 1957 3 Sheets-Sheet 2

INVENTOR
ROGER A. LLOYD
BY Beale and Jones

United States Patent Office

2,953,443
Patented Sept. 20, 1960

2,953,443

CHEMICAL HEATING COMPOSITION, HEATING UNIT CONTAINING THE SAME AND METHOD OF MANUFACTURE

Roger A. Lloyd, Verona, Wis., assignor to Alloyd Engineering Laboratory, Inc., a corporation of Wisconsin Filed Feb. 11, 1957, Ser. No. 639,425

23 Claims. (Cl. 44—3)

This invention relates to an autogenous heating device and more particularly to a hermetically sealed heating unit and process of producing the same.

Heretofore autogenous heating devices have been known and used to provide a portable heating composition adapted to liberate heat wherever needed in limited quantity such as for heating foodstuffs, defrosting or sterilization. Such autogenous heating compositions containing exothermically reacting chemicals have been commonly prepared with vented containers whereby liberated gases can escape non-explosively. It has also been proposed to provide the combustible charge of autogenous heating material with a hermetically sealed container to protect the reactants from humidity or spillage and to prevent the escape of solid or molten products of combustion. Such hermetically sealed containers have always been only partially filled thereby providing essential air space within the container to reduce the tendency of the container to rupture from expansion of air in the container. This problem is of great consequence in view of the fact that a highly exothermic charge may raise the container walls to a red heat. At this elevated temperature, enormous pressures and concomitant danger of disruption of the container are thus risked.

It is an object of this invention to provide a hermetically sealed heating unit completely full of autogenous composition combustible without the production of gaseous combustion products. It is a further object of this invention to provide an autogenous combustible material devoid of organic matter. An additional object is to provide a suitable ignition means for a dense autogenous combustible material which does not yield gaseous combustion products. An additional object is to provide a compact hermetically sealed heating unit which remains sealed during the exothermic process. Another object is to provide a portable heating unit suitable for heating, or for the ignition of fuels, propellents or explosives. A further object is to provide processes for effecting the above. A still further object is to provide a battery holder and electrical contact device for electrically igniting an autogenous heating unit. Additional advantages will be apparent to the experts in this art.

Figure 2:
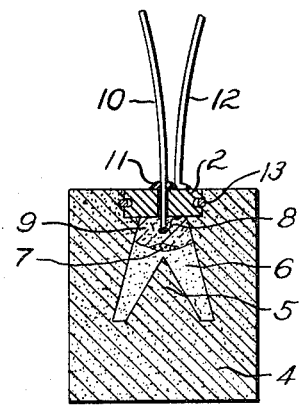
Figure 3:
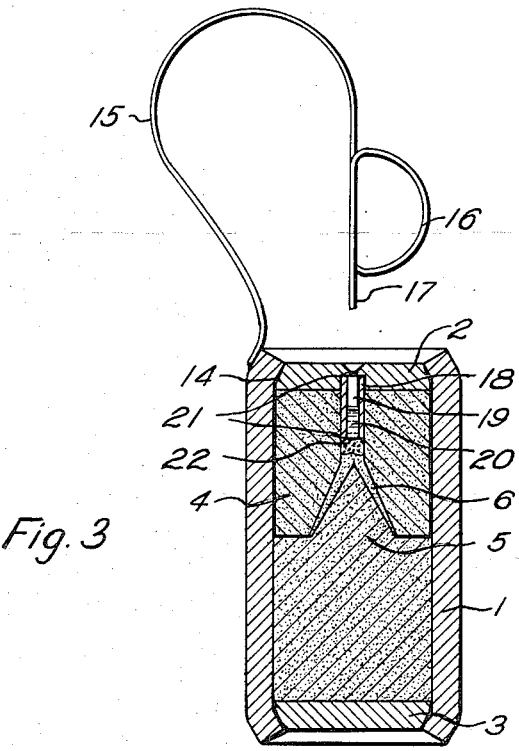
Figure 4:
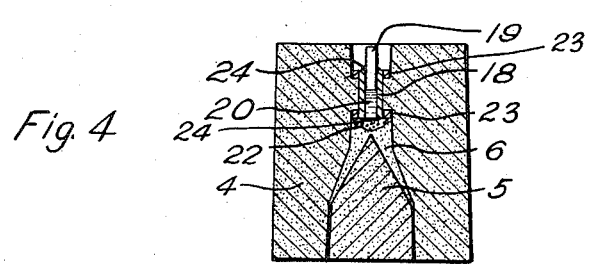

In the accompanying drawing Fig. 1 is a longitudinal cross sectional view of a self-contained hermetically sealed heating unit. Fig. 2 is a similar view of a heating composition adapted for use in either an expendable or reusable container. Fig. 3 is a similar view of a hermetically sealed heating unit with chemical ignition. Fig. 4 is a similar view of a detailed chemical ignition means with an autogenous unenclosed heating composition.

Referring to Fig. 1 hereof, the cylindrical housing 1 is hermetically sealed by tightly fitting against plug 2 and bottom plug 3. The dense, compressed autogenous combustion composition 4 has an apex 5 surrounded by an annular space filled with less dense autogenous combustion material 6 in contact with a trace of low density primer 7 topped by low thermal conductivity and low density autogenous combustion material 9 in which is embedded a hot wire 8 grounded at one end to top plug 2 and at the other end to an insulated or enameled wire 10 passing through a perforation in plug 2 and sealed with an insulating or tough plastic material 11. A second wire 12 is in electrical contact with and firmly attached to end plug 2. Activation of the heating unit is effected by applying an electrical potential to wires 10 and 12 whereby wire 8 becomes sufficiently hot to start the combustion process in the heating unit. If desired, a sealing gasket 14 can be used, or the seams can be soldered or welded.

Fig. 2 shows an unenclosed heating unit adapted to be used in an auxiliary externally provided container. The indicia are as given in Fig. 1. A simple expansion ring 13 is shown holding end plug 2 in place. If desired, end plug 2 may be made of autogenous combustible material, in which event wire 12 is caused to pass through a perforation in plug 2 so as to make direct contact with hot wire 8 and complete the electrical circuit through 10, 8 and 12.

Fig. 3 shows a chemically ignited heating unit bearing indicia as above. The primary or principal combustion material is shown as made in two parts 4 and 5. This feature is also utilizable with other ignition means. Wire igniting tool and holder 15 bears a loop handle 16 with top 17 for breaking seal 21 and depressing plunger 19 in cylinder 18 thereby forcing oxidizable liquid 20 through friable cylinder end seal 21 and into contact with oxidizing agent 22, thereby causing chemical ignition of the unit.

Fig. 4 shows an unenclosed chemically ignitable heating charge bearing indicia as above but having cylinder end seals 24 and cylinder retainer rings 23.

Figure 5:
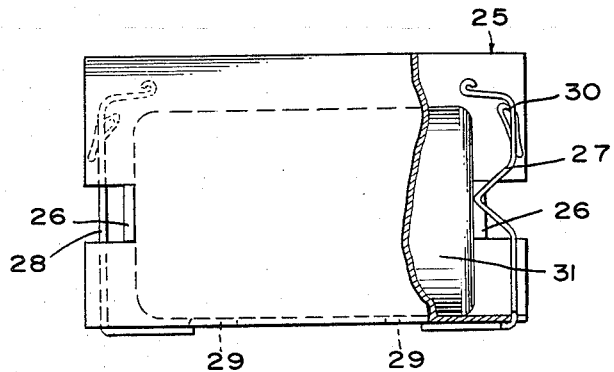
Figure 7:
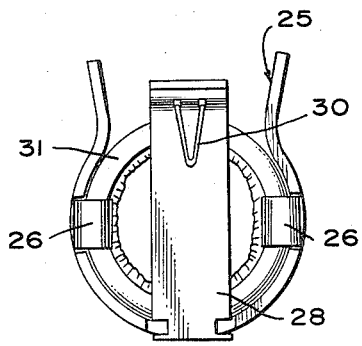
Figure 6:
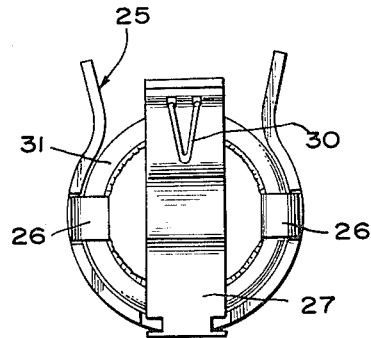

Fig. 5 shows a battery holder and ignition device especially adapted to provide manually controlled electrical contact with a small electric battery to wires such as used in the herein described electrically ignited heating unit. The holder is suitable for suspending the heating unit by its wires and thereby permitting easy movement of the heating unit. Non-conductive holder 25 bears battery retaining lugs 26 and metal contact strips 27 and 28 held in place by clips through slots 29. Electrical wire fasteners 30 will tightly and temporarily hold wires in contact with strips 27 and 28. Attaching a heating unit as shown in Fig. 1 with wires 10 and 12 to clips 30 and squeezing contact strips 27 and 28 whereby contact is made with battery 31 causes the heating unit to become activated.

A hermetically sealed autogenous heating unit such as contemplated by the present invention includes an external housing containing a composition combustible substantially without production of gaseous combustion products. It is preferred that the housing be completely full of autogenous combustible composition. The predominant part of the autogenous combustible composition should be of relatively high density. A minor proportion of autogenous combustible composition located adjacent to the ignition means should be of relatively low density.

The housing for the autogenous heating unit is of selected material, mass and strength to safely withstand the highest temperature and pressure produced during combustion of the contents.

In usage where rapid heat transfer from the heating capsule surface is assured, as for example in the immersion heating of a high specific heat material such as water, the highest attainable housing temperature is much lower than when the capsule is used to heat a vapor. In high heat dissipation and high heat transfer usage, the capsule housing may be made of lower strength and mass of material than otherwise required.

The heating capsule housing may vary also with the composition of the contained chemical autogenous combustion mixture. A part of the heat capacity disposition of the housing can be relieved by using internal heat absorbing material such as metals or stable inorganic compounds within the combustible mixture as is known in the art. By suitably proportioning the combustible mixture reactants, internal heat absorbing materials, and the strength and mass of the housing, the housing can be made of relatively low melting point metals such as aluminum or magnesium or their alloys or even plastics especially when the usage is to be under conditions of rapid heat transfer and dissipation. For unrestricted use the housing is preferably made of copper, iron or steel.

The housing contains an autogenous composition combustible without production of gaseous combustion products. Chemical reactants suitable for this purpose are well known in the art. Such reactants include a reducing agent, such as finely divided aluminum, lithium, magnesium, zinc, nickel, antimony, zirconium, or iron, and their alloys, or reducing intermetallic compounds such as calcium silicide with an oxidizing agent such as potassium or other permanganate; sodium or potassium or other alkali or alkaline earth metal chlorates or perchlorates; inorganic oxides or peroxides such as barium peroxide, iron oxide, copper oxide, litharge, manganese dioxide; sodium, barium or other chromates; or sulfides as for example, ferrous sulfide.

If desired, internal heat absorbing material is mixed with the chemical reactants. Suitable for this purpose are iron, steel, clay, sand, diatomaceous earth or glass among other non-volatile diluents. An excess of either the oxidizing or reducing reactant is similarly useful for internal heat absorption.

For maximum efficiency and conservation of space and weight, an autogenous combustion composition of aluminum metal particles and iron oxide is preferred. Desirably these reactants should be in stoichiometric proportion and initially in a finely divided state. Such a reaction mixture is inert up to the ignition temperature of about 2100° F. Upon ignition a temperature of about 4600° F. can be produced.

While alumino-thermic mixtures such as the above have been put into hermetically sealed units, it has heretofore always been necessary to slack fill the unit so as to allow necessary gas expansion space. In keeping with the instant invention the autogenous combustible mixture, especially alumino-thermic mixture, is subjected to elevated temperature and pressure to provide a relatively strong, compact heating composition which does not require gas expansion space. The autogenous combustible composition, especially alumino-thermic material is thermalized by bringing it to an elevated temperature of preferably from about 400° F. to 2000° F. but below the ignition temperature. This stabilizes the composition, reduces the gas formation and produces greater uniformity during combustion. Compaction of the hot mixture is effected at an elevated pressure preferably from 5,000 or 10,000 to 40,000 pounds per square inch. Low pressure is required at high temperature and high pressure is required at low temperatures to achieve the necessary product density. While it is possible to compact the combustion mixture by suitable pressure or binders at low or room temperature, it has been found that deleterious and unsafe products frequently result from such prior art processing. The present invention preferably omits a binding material which would dilute the active ingredients and extend the volume required for the same amount of heat liberation. Compaction is obtained by pressure and/or temperature, the pressure necessary being a function of the yield point of the metal, particularly aluminum, in the heating composition at the temperature of compaction.

Either before, during or after compression, or in combination, it is desirable to remove air from the autogenous combustible composition. The air is conveniently removed by maintaining the composition under vacuum. Suitably, residual air can be swept out by releasing the vacuum with oxygen and if desired reapplying vacuum to remove residual vestiges of inert gas from the interstices of the autogenous combustible composition. Repetition of this process enhances the efficiency of inert gas removal. Air removal is alternatively effected by passing the combustion composition materials, separately and/or mixed, countercurrent to a stream of oxygen whereby the air is swept out. The air removal technique is an additional feature of consequence in the improvement of the instant hermetically sealed autogenous heating unit. Whereas compressed alumino-thermic composition filling a container exhibited, upon ignition, a pressure of 350 pounds per square inch, an otherwise identical composition which has been subjected to repeated oxygen replacement of the air, as described above, exhibited a pressure, upon ignition, of only 65 pounds per square inch. When encased in an hermetically sealed cartridge, the mixture in the cartridge is, before ignition, preferably under subatmospheric internal pressure and/or with the presence of oxygen rather than air internally.

By suitable compaction, as described above, the principal autogenous combustion mixture acquires a density of preferably at least 2.7 grams per cubic centimeter. Concomitantly the void volume or space not occupied by solid is reduced to less than 35 percent based on total volume. This is accompanied by sufficient strength to enable maintaining the selected shape of the combustion composition. A product having a compressive strength of at least 2,000 pounds per square inch has been found to be particularly desirable. With suitable temperature and pressure, an aluminum-iron oxide composition having a density of 3.0 and compressive strength of 8,000 pounds per square inch is attainable. In general a cylindrical shape has been found convenient although such shape is not essential. Of decided value is the instant fabrication of the principal, dense, autogenous combustion mixture with an apex at the point where ignition is to be accomplished. This apex, tip, point, cone or summit is, in usage, surrounded with a collar or cap of thermal insulating material, preferably an autogenous combustible material of relatively lower density and preferably less than 2.4 grams per cubic centimeter, and lower heat conduction. Thus the highly compacted principal autogenous combustible material is readily ignitable by the lower density material. The apex may be machined or molded onto the thermal composition. If desired the apex may be separately molded and positioned with a relatively large area abutting the principal dense autogenous combustible material.

The apex of the primary or principal dense combustible material is preferably surrounded or banded with low thermal conductivity material particularly additional autogenous combustible material having a relatively low thermal conductivity. Loosely packed alumino-thermic material, illustratively aluminum-iron oxide mixture is suitable for this. Other autogenous combustible material is also utilizable around the apex. A satisfactory composition for surrounding the apex or filling the space around the apex consists of three parts by weight of a stoichiometric mixture of aluminum and black iron oxide and one part by weight of a stoichiometric mixture of aluminum and barium peroxide.

Between this apex banding material and the ignition device, it is convenient to use a minute amount of triggering composition such as a blend of one part of a stoichiometric mixture of magnesium with barium peroxide and one part of a stoichiometric mixture of aluminum with barium peroxide. Other low temperature ignition materials may be similarly utilized.

Primary ignition of the triggering material, or low density material surrounding the high density apex, can be effected by any convenient means such as a hot wire, percussion, fuse or chemical ignition.

In using a hot wire ignition system it is desirable to surround the wire in the heating unit with a very small amount of a mixture containing insulating material and autogenous combustible material to facilitate the obtention of a sufficiently high ignition temperature being attained by the hot wire. For this purpose a suitable composition consists of 3 parts of powdered magnesia and one part of a stoichiometric mixture of magnesium with barium peroxide.

A particularly convenient size of heating unit of this invention which heats one cup of water from 20° C. to 90° C. is made of a cylindrical housing of ½ or ¾ inch standard black iron pipe with end plugs of comparable thickness, charged with about 20 grams of a compressed, thermalized, stoichiometric mixture of aluminum and black iron oxide as described above. This housing is capable of withstanding very high pressure at low temperature. As the temperature rises, the yield point of the housing is markedly but not dangerously lowered. In the absence of inert gas in the head space, in accordance with the instant invention, any small amount of housing expansion results in a very significant reduction in internal pressure thus increasing the safety and maintenance of the hermetic seal.

The following examples, illustrative of the present invention, are not to be construed as limiting.

*Example 1*

A 19 gram portion of an intimate mixture of aluminum powder and powdered ferroso-ferric oxide, $Fe_3O_4$, in a stoichiometric ratio of 4.62 to 14.88 was placed in an iron pipe and subjected to a reduced pressure of ½ inch of mercury, where zero would correspond to the vapor pressure of mercury at room temperature. The vacuum was released by admitting oxygen. This vacuum and oxygen treatment was repeated and the temperature quickly taken to 840° F. This composition while at this temperature, was molded by mechanical pressure of 10,000 pounds per square inch in the iron pipe to produce a cylinder with a conical end or apex.

Immediately surrounding the apex of the combustion material, there was deposited 0.5 gram of uncompressed aluminum-iron oxide combustion material as described above.

Over this was placed 1 milligram of a one to one mixture of a stoichiometric mixture of aluminum powder and barium peroxide powder and a stoichiometric mixture of magnesium powder and barium peroxide powder.

Over this was placed 10 milligrams of a 3 to 1 mixture of magnesia and a stoichiometric mixture of magnesium powder and barium peroxide powder.

In this last mixture a heating wire was inserted as shown in Fig. 1.

The entire assembly was then subjected to reduced ambient pressure of ½ inch of mercury and the casing was crimped over the end plugs.

Using low resistance heating wire, sufficient ignition temperature is attainable from a 1½ volt battery momentarily attached to the heating wire to liberate 16,800 calories.

*Example 2*

As in Example 1, a dense autogenous combustible composition having a mass of 20 grams was formulated with a cone in an iron pipe.

Above and around the cone, there was charged 0.3 gram of the uncompacted combustible composition.

Above this was positioned 40 milligrams of a 3 to 1 mixture of potassium permanganate and a stoichiometric mixture of magnesium powder and barium peroxide powder.

Above this, separated by a frangible diaphragm, there was placed a cylinder and plunger, the cylinder having a bore of 0.045 inch and containing a ⅛ inch plug of diethylene glycol which was displaceable through the diaphragm by a ⅛ inch movement of the plunger through the cylinder.

This unit was crimped and hermetically sealed under vacuum.

Movement of the plunger forced the glycol through the frangible diaphragm to cause rapid ignition of the heating unit contents with the resulting liberation of 16,800 calories.

Glycerine can be used in place of glycol as the oxidizable liquid in conjunction with potassium permanganate.

*Example 3*

Otherwise like Example 1, replacing the heating wire by a percussion primer produced similar results when the primer was struck.

*Example 4*

A 20 gram portion of an intimate mixture of aluminum powder and powdered ferroso-ferric oxide in a ratio of 4.7 to 14.9 containing a slight excess of aluminum powder was passed downwardly by tumbling through a three-foot long rotating tube inclined at an angle of five degrees while oxygen gas was passed upwardly through the tube. After this deaeration, the mixture in oxygen was raised to a temperature of 1100° F. and compacted by a pressure of 5,000 pounds per square inch. The heating unit and ignition system was then assembled as described in Example 1.

Upon ignition, about 17,000 calories were safely liberated.

I claim:

1. An autogenous combustible aluminum-iron oxide composition comprising a mixture of aluminum and iron oxide having a density of at least 2.7 grams per cubic centimeter, a compressive strength of at least 2000 pounds per square inch and a void volume of less than 35 percent based on the total volume said mixture having been compressed at a pressure of 5000 to 40,000 pounds per square inch at a temperature of from 2000° F. to about 400° F.

2. An autogenous combustible aluminum-iron oxide composition as set forth in claim 1 having the voids therein filled with oxygen.

3. An autogenous combustible aluminum-iron oxide composition comprising a mixture of aluminum and iron oxide having a density in the range of 2.7 to 3.0 grams per cubic centimeter, a compressive strength in the range of 2000 to 8000 pounds per square inch and a void volume of less than 35 percent based on the total volume said mixture having been compressed at a pressure of 5000 to 40,000 pounds per square inch at a temperature of from 2000° F. to about 400° F.

4. An autogenous combustible aluminum-iron oxide composition as set forth in claim 3 having the voids therein filled with oxygen.

5. An autogenous combustible composition comprising a homogeneous mixture of a powdered metal selected from the group consisting of aluminum, lithium, magnesium, zinc, nickel, antimony, zirconium, iron, and calcium silicide and a powdered oxidizing agent selected from the group consisting of potassium permanganate, alkali metal and alkaline earth metal chlorates and perchlorates, barium oxide, iron oxide, copper oxide, litharge, manganese dioxide, sodium and barium chromates and ferrous sulfide, said mixture having been compressed at a pressure of 5,000 to 40,000 pounds per square inch at a temperature of from 2000° F. to about 400° F., and having a density of at least 2.7 grams per cubic centimeter, a compressive strength of at least 2000 pounds per square inch and a void volume of less than 35 percent based on the total volume.

6. A method of preparing an autogenous combustible composition which comprises mixing a powdered metal selected from the group consisting of aluminum, lithium, magnesium, zinc, nickel, antimony, zirconium, iron, and calcium silicide and solid particles of an oxidizing agent selected from the group consisting of potassium permanganate, alkali metal and alkaline earth metal chlorates and perchlorates, barium oxide, iron oxide, copper oxide, litharge, manganese dioxide, sodium and barium chromates and ferrous sulfide to form a homogeneous mixture thereof, compressing said mixture while hot, said mixture being heated to a temperature above at least 375° F. but below the ignition temperature of said mixture and said heated mixture being compressed at a pressure of at least 5,000 pounds per square inch to form a compressed autogenous combustible mixture having a density of at least 2.7 grams per cubic centimeter, a compressive strength of at least 2000 pounds per square inch and a void volume of less than 35 percent based on the total volume.

7. A method of preparing an autogenous combustible aluminum-iron oxide composition which comprises mixing powdered aluminum and solid particles of iron oxide to form a homogeneous mixture thereof, compressing said mixture while hot, said mixture being heated to a temperature in the range of from 375° F. and 2000° F., and said heated mixture being compressed at a pressure in the range of 40,000 to 10,000 pounds per square inch to form an autogenous combustible mixture having a density of at least 2.7 grams per cubic centimeter, a compressive strength of at least 2000 pounds per square inch and a void volume of less than 35 percent based on the total volume.

8. A method of preparing an autogenous combustible aluminum-iron oxide composition as set forth in claim 7, wherein said homogeneous mixture is placed on an ambient atmosphere consisting of oxygen and thereafter subjected to said heating and compressing steps.

9. A method of preparing an autogenous combustible aluminum-iron oxide composition as set forth in claim 7, wherein said compressed mixture is subjected to vacuum and the vacuum released while said compressed mixture is in an ambient atmosphere consisting of oxygen.

10. A method of preparing an autogenous combustible aluminum-iron oxide composition as set forth in claim 8, wherein said homogeneous mixture is first subjected to vacuum and then placed in said ambient atmosphere consisting of oxygen.

11. A method of preparing an autogenous combustible aluminum-iron-oxide composition as set forth in claim 9, wherein said treatment with vacuum and oxygen is repeated.

12. A hermetically sealed heating unit comprising a metallic container completely full of an autogenous combustible composition comprising a homogeneous mixture of a powdered metal selected from the group consisting of aluminum, lithium, magnesium, zinc, nickel, antimony, zirconium, iron, and calcium silicide and solid particles of an oxidizing agent selected from the group consisting of potassium permanganate, alkali metal and alkaline earth metal chlorates and perchlorates, barium oxide, iron oxide, copper oxide, litharge, manganese dioxide, sodium and barium chromates and ferrous sulfide, said mixture having been compressed at a pressure of 5,000 to 40,000 pounds per square inch at a temperature of from 2000° F. to about 400° F. and having a density of at least 2.7 grams per cubic centimeter, a compressive strength of at least 2000 pounds per square inch and a void volume of less than 35 percent based on the total volume.

13. A hermetically sealed heating unit as set forth in claim 12 wherein the voids in said mixture are filled with oxygen.

14. A hermetically sealed heating unit comprising a metallic container substantially full of an autogenous combustible aluminum-iron oxide composition comprising a homogeneous mixture of aluminum and iron oxide, said mixture having been compressed at a pressure of 5000 to 40,000 pounds per square inch at a temperature of from 2000° F. to about 400° F. and having a density of at least 2.7 grams per cubic centimeter, a compressive strength of at least 2000 pounds per square inch and a void volume of less than 35 percent based on the total volume.

15. A hermetically sealed heating unit as set forth in claim 14, wherein said metallic container is at a subatmospheric internal pressure.

16. A hermetically sealed heating unit as set forth in claim 14, wherein the voids in said mixture are filled only with oxygen.

17. A hermetically sealed heating unit as set forth in claim 14, wherein said mixture is provided with a cavity extending inwardly from a wall of said container into said mixture and said cavity is filled with a mixture of aluminum and iron oxide of low thermal conductivity having a density of less than 2.4 grams per cubic centimeter.

18. A hermetically sealed heating unit as set forth in claim 17 wherein said aluminum-iron oxide mixture disposed in said cavity is provided with an ignition means.

19. A hermetically sealed heating unit as set forth in claim 18 wherein said ignition means comprises an electrical conductor having a portion thereof embedded in the mixture disposed in said cavity and said conductor is capable of generating heat upon the passage of an electric current therethrough to ignite said surrounding mixtures.

20. A hermetically sealed heating unit as set forth in claim 18 wherein said ignition means is a chemical primer.

21. A hermetically sealed heating unit as set forth in claim 18, wherein said ignition means is a percussion primer.

22. A hermetically sealed heating unit as set forth in claim 19, wherein said electrical conductor comprises a loop external of the heating unit and having a portion of each end of said loop embedded in the mixture disposed in said cavity, said loop being severable to provide for the flow of an electric current in the severed portions.

23. A hermetically sealed heating unit as set forth in claim 20, wherein said chemical primer consists of an oxidizing solid and an oxidizable liquid separated by a frangible barrier, said solid and liquid being capable of reacting exothermically upon the destruction of said barrier to ignite the mixture disposed in said cavity.

References Cited in the file of this patent

UNITED STATES PATENTS

| | | |
|---|---|---|
| 2,198,612 | Hardy | Apr. 30, 1940 |
| 2,388,466 | Caldwell | Nov. 6, 1945 |
| 2,500,790 | Bennett | Mar. 14, 1950 |
| 2,560,452 | Kerr | July 10, 1951 |
| 2,624,280 | Zebrell | Jan. 6, 1953 |
| 2,830,885 | Kerr et al. | Apr. 15, 1958 |

FOREIGN PATENTS

| | | |
|---|---|---|
| 8,642 | Great Britain | of 1915 |